US008572549B2

(12) United States Patent  
Ganesh et al.

(10) Patent No.: US 8,572,549 B2
(45) Date of Patent: Oct. 29, 2013

(54) ESTIMATION OF WEB ACCESSIBILITY ASSESSMENT AND REMEDIATION EFFORTS

(75) Inventors: Jai Ganesh, Bangalore (IN); Shrirang Prakash Sahasrabudhe, Pune (IN); Neha Ranjeet Ghorpade, Pune (IN)

(73) Assignee: Infosys Limited, Bangalore (IN)

( * ) Notice: Subject to any disclaimer, the term of this patent is extended or adjusted under 35 U.S.C. 154(b) by 243 days.

(21) Appl. No.: 13/109,859

(22) Filed: May 17, 2011

(65) Prior Publication Data

US 2012/0254826 A1 Oct. 4, 2012

(30) Foreign Application Priority Data

Mar. 31, 2011 (IN) .......................... 1056/CHE/2011

(51) Int. Cl.
G06F 9/45 (2006.01)
G06F 15/16 (2006.01)
G06F 11/00 (2006.01)
G06F 17/25 (2006.01)
G06F 3/00 (2006.01)
G06F 9/44 (2006.01)

(52) U.S. Cl.
USPC ... 717/101; 703/22; 707/999.001; 707/999.1; 707/999.202; 709/229; 714/57; 715/234; 715/745; 717/113; 717/117; 717/143

(58) Field of Classification Search
None
See application file for complete search history.

(56) References Cited

U.S. PATENT DOCUMENTS

| 7,240,279 | B1 * | 7/2007 | Chartier et al. ............... 717/143 |
| 7,603,657 | B2 * | 10/2009 | Gassner et al. ............... 717/113 |
| 2002/0103914 | A1 * | 8/2002 | Dutta et al. .................... 709/229 |
| 2002/0156799 | A1 * | 10/2002 | Markel et al. ................. 707/202 |
| 2004/0148568 | A1 * | 7/2004 | Springer ....................... 715/513 |
| 2005/0160065 | A1 * | 7/2005 | Seeman ............................ 707/1 |
| 2006/0195819 | A1 * | 8/2006 | Chory et al. .................. 717/117 |
| 2007/0038655 | A1 * | 2/2007 | Bronstad et al. .............. 707/100 |
| 2008/0208561 | A1 * | 8/2008 | Bronstad et al. ................ 703/22 |
| 2009/0113287 | A1 * | 4/2009 | Yee ................................ 715/234 |
| 2010/0070872 | A1 * | 3/2010 | Trujillo ......................... 715/745 |
| 2010/0131797 | A1 |  5/2010 | Ganesh et al. |
| 2010/0257413 | A1 * | 10/2010 | Brunet et al. .................... 714/57 |

OTHER PUBLICATIONS

Loretta Guarino et al., WCAG 2.0: A Web Accessibility Standard for the Evolving Web, 2008, [Retrieved on Jan. 28, 2013]. Retrieved from the internet: <URL: http://dl.acm.org/citation.cfm?id=1368069> 7 Pages (109-115).*

(Continued)

*Primary Examiner* — Don Wong
*Assistant Examiner* — Anibal Rivera
(74) *Attorney, Agent, or Firm* — Klarquist Sparkman, LLP

(57) ABSTRACT

Tools and techniques are described for estimating web accessibility and remediation efforts. One or more web accessibility standards can be indicated to be included in the effort estimate. A user can indicate which individual guidelines are to be included in standard test effort estimates by selecting individual guidelines, sub-guidelines or priority or success criteria levels. Standard test effort estimates are calculated based on test factors associated with the indicated individual guidelines or sub-guidelines. A total test effort estimate is calculated based on the standard test effort estimates and one or more web page counts, and a web accessibility and remediation effort estimate is calculated based on the total test effort estimate. A framework implementing the effort estimation methods can comprise multiple spreadsheets for use within a spreadsheet application running on a computing device.

17 Claims, 8 Drawing Sheets

OTHER PUBLICATIONS

Julio Abascal et al., The use of guidelines to automatically verify web accessibility, Feb. 19, 2004, [Retrieved on Jan. 28, 2013]. Retrieved from the internet: <URL: http://download.springer.com/static/pdf/253/art%/0253A10.1007%0252Fs10209-003-0069-3.pdf?auth66=1359581167_a45d9fe7e4aab54e4f5a7bf39edd53d9&ext=.pdf> 9 Pages (71-78).*

Wendy Chisholm et al., Web Contect Accessibility Guidelines 1.0, 2001, [Retrieved on Jan. 28, 2013]. Retrieved from the internet: <URL: http://dl.acm.org/citation.cfm?id=379550> 21 Pages (34-53).*

Brajnik, "Web Accessibility Testing: When the Method is the Culprit," *Lecture Notes in Computer Science*, vol. 4061/2006, pp. 156-163 (2006).

Brewer, "Web Accessibility Highlights and Trends," *ACM SIGCAPH Computers and the Physically Handicapped Newsletter*, vol. 15, No. 76, pp. 15-16 (Jun. 2003).

Di Blas et al., "'Usable Accessibility' to the Web for Blind Users," *Proc. of 8th ERCIM Workshop: User Interfaces for All*, pp. 28-35 (2004).

Hudson, "Inclusive Design: Accessibility Guidelines Only Part of the Picture," *Interactions*, vol. 11, No. 4, pp. 55-56 (Jul./Aug. 2004).

Kelly et al., "Accessibility 2.0: People, Policies and Process," *Proceedings of the 2007 International Cross-Disciplinary Conference on Web Accessibility (W4A)*, New York, USA (May 7-8, 2007) 10 pages.

Thatcher, "Web Accessibility—What Not to do," *Technology and Persons with Disabilities Conference 2004*, California State University Northridge (2004), downloaded from http://www.csun.edu/cod/conf/2004/proceedings/80.htm, 5 pages (document dated Sep. 29, 2003).

Thomsen et al., "Building a Web Warehouse for Accessibility Data," *DOLAP '06 Proceedings of the 9th ACM Int'l Workshop on Data Warehousing and OLAP*, pp. 43-50 (2006).

"The Web, Access and Inclusion for Disabled People," The Disability Rights Commission (United Kingdom), 54 pages (2004).

Zeng, "Evaluation and Enhancement of Web Content Accessibility for Persons with Disabilities," Doctoral dissertation, Ph.D., University of Pittsburgh (2004), downloaded from http://etd.library.pitt.edu/ETD/available/etd-04192004-155229/unrestricted/XiaomingZeng_April2004.pdf, 173 pages.

* cited by examiner

| | A | B | C | D | E | F |
|---|---|---|---|---|---|---|
| | Phase | Steps | Estimation Guideline | Effort Estimate (in Phrs) | Tools/Templates Reuse | Effort Saved due to Reuse (in Phrs) |
| 1 | Gather Test Requirements | Understand test requirements. | Fixed time | 8.0 | | |
| 2 | | Prepare the requirement document (.xls), Review / Rework | Fixed time | 24.0 | Requirement Document for each type of compliance guideline | 8.0 |
| 3 | Test Strategizing | Decide on tools. Tool procurement. | Fixed time | 2.0 | | |
| 4 | | Training on specific tools | Estimation guideline for training on specific tool(s) | 10.0 | | |
| 5 | Prepare Test Cases | Creation of test cases based on the selected accessibility requirements. | Estimation guideline for test case preparation & execution | 23.2 | Test cases for each requirement document created on step 2 | 5.8 |
| 6 | Setup Test Environment | Setup of test environment. Installation and configuration of software. | Fixed time | 8.0 | | |
| 7 | Test Execution and Defect Reporting | Execution of test cases and logging of results. | Estimation guideline for test case preparation & execution | 115.8 | Iprowe | 110.0 |
| 8 | Defect Analysis and Solution Proposition | Root cause analysis and share findings with client. | Fixed time | 8.0 | | |
| 9 | | | | | | |
| 10 | Total | | | 199.0 | | 123.8 |

FIG. 2

| | A | B | C | D |
|---|---|---|---|---|
| 1 | Estimation Guideline for Training | | | |
| 2 | Technology/Tool | Select | Effort Estimate (in Phrs) | Cost (in USD) |
| 3 | JAWS | TRUE | 8.0 | $ 1,100 |
| 4 | Color Contrast Analyser | FALSE | 0.0 | $ - |
| 5 | Opera Browser | TRUE | 1.0 | $ - |
| 6 | WebbIE Text browser | TRUE | 1.0 | $ - |
| 7 | Total | | 10.0 | $ 1,100 |

FIG. 3

| | A | B | C |
|---|---|---|---|
| 1 | Guideline | Select | Average Effort (in Phrs) |
| 2 | WCAG 1.0 ☑ | TRUE | 13.5 |
| 3 | WCAG 2.0 ☑ | TRUE | 16.6 |
| 4 | Section 508 ☑ | TRUE | 8.5 |
| 5 | DDA Australia ☐ | FALSE | 0.0 |
| 6 | DDA UK ☐ | FALSE | 0.0 |
| 7 | STQC ☐ | FALSE | 0.0 |
| 8 | BITV Germany ☐ | FALSE | 0.0 |
| 9 | Total | | 38.6 |
| 10 | | | |
| 11 | | No of Web Pages | Estimated Effort (in Phrs) |
| 12 | Simple | 5 | 19.3 |
| 13 | Medium | 3 | 57.9 |
| 14 | Complex | 1 | 38.6 |
| 15 | Total Effort | | 115.8 |

FIG. 4

| | A | B | C | D | E | F |
|---|---|---|---|---|---|---|
| 1 | Guideline Number | Guideline | Priority | Select | Test Factor | Effort Estimate (in Phrs) |
| 2 | | | | | | 2.2 |
| 3 | 1 | Provide equivalent alternatives to auditory and visual content. | P1 | TRUE | 22 | 0 |
| 4 | | | P2 (TRUE/FALSE) | TRUE | 0 | 0 |
| 5 | | | P3 | TRUE | 0 | 0.6 |
| 6 | 2 | Don't rely on color alone. | P1 | TRUE | 6 | 3.7 |
| 7 | | | P2 | TRUE | 37 | 0 |
| 8 | | | P3 | FALSE | 0 | 0 |
| 9 | 3 | Use markup and style sheets and do so properly. | P1 | FALSE | 0 | 0 |
| 10 | | | P2 | FALSE | 49 | 1.1 |
| 11 | | | P3 | FALSE | 0 | 0 |
| 12 | 4 | Clarify natural language usage | P1 | TRUE | 11 | 0 |
| 13 | | | P2 | TRUE | 0 | 0.3 |
| | | | P3 | TRUE | 3 | |
| 35 | | | | | | 0.5 |
| 36 | 12 | Provide context and orientation information. | P1 | TRUE | 5 | 1.4 |
| 37 | | | P2 | TRUE | 14 | 0 |
| 38 | | | P3 | TRUE | 0 | 0 |
| 39 | 13 | Provide clear navigation mechanisms. | P1 | TRUE | 6 | 0.6 |
| 40 | | | P2 | TRUE | 0 | 0 |
| 41 | | | P3 | TRUE | 0 | 0 |
| 42 | 14 | Ensure that documents are clear and simple. | P1 | TRUE | 0 | 0 |
| 43 | | | P2 | TRUE | 0 | 0 |
| 44 | | | P3 | TRUE | 0 | 0 |
| 45 | | Total | | | 190 | 14.1 |

FIG. 5

| | A | B | C | D | E | F |
|---|---|---|---|---|---|---|
| 1 | Guideline Number | Guideline | Success Critiera | Select | Test Factor | Estimate (phrs) |
| 2 | 1.1 | Text Alternatives: Provide text alternatives for any non-text content so that it can be changed into other forms people need, such as large print, braille, speech, symbols or simpler language. | A | TRUE | 18 | 1.8 |
| 3 | | | AA | TRUE | 0 | 0 |
| 4 | | | AAA | TRUE | 0 | 0 |
| 5 | 1.2 | Time-based Media: Provide alternatives for time-based media. | A | TRUE | 0 | 0 |
| 6 | | | AA | TRUE | 0 | 0 |
| 7 | | | AAA | TRUE | 0 | 0 |
| 8 | 1.3 | Adaptable: Create content that can be presented in different ways (for example simpler layout) without losing information or structure. | A | TRUE | 67 | 6.7 |
| 9 | | | AA | TRUE | 0 | 0 |
| 10 | | | AAA | TRUE | 0 | 0 |
| 11 | 1.4 | Distinguishable: Make it easier for users to see and hear content including separating foreground from background. | A | TRUE | 0 | 0 |
| 12 | | | AA | TRUE | 39 | 3.9 |
| 13 | | | AAA | TRUE | 10 | 1 |
| 14 | 2.1 | Keyboard Accessible: Make all functionality available from a keyboard. | A | TRUE | 5 | 0.5 |
| 15 | | | AA | TRUE | 0 | 0 |
| 16 | | | AAA | TRUE | 0 | 0 |
| 26 | 3.1 | Readable: Make text content readable and understandable. | A | TRUE | 0 | 0 |
| 27 | | | AA | TRUE | 0 | 0 |
| 28 | | | AAA | TRUE | 0 | 0 |
| 29 | 3.2 | Predictable: Make Web pages appear and operate in predictable ways. | A | TRUE | 2 | 0.2 |
| 30 | | | AA | TRUE | 1 | 0.1 |
| 31 | | | AAA | TRUE | 0 | 0 |
| 32 | 3.3 | Input Assistance: Help users avoid and correct mistakes. | A | TRUE | 1 | 0.1 |
| 33 | | | AA | TRUE | 0 | 0 |
| 34 | | | AAA | TRUE | 0 | 0 |
| 35 | 4.1 | Compatible: Maximize compatibility with current and future user agents, including assistive technologies | A | TRUE | 8 | 0.8 |
| 36 | | | AA | TRUE | 0 | 0 |
| 37 | | | AAA | TRUE | 0 | 0 |
| 38 | Total | | | | 166 | 16.6 |

FIG. 6

| | A | B | C | D | E |
|---|---|---|---|---|---|
| 1 | Guideline Number | Guideline | Select | Test Factor | Effort Estimate (in Phrs) |
| 2 | 1194.22 | Web-based intranet and internet information and applications. | TRUE | 85 | 8.5 |
| 3 | | Total | | | 8.5 |

FIG. 7

ESTIMATION OF WEB ACCESSIBILITY ASSESSMENT AND REMEDIATION EFFORTS

CROSS REFERENCE TO RELATED APPLICATIONS

This application claims priority from Indian Application No. 1056/CHE/2011, filed in India on Mar. 31, 2011.

BACKGROUND

The World Wide Web needs to be accessible to the disabled population, which comprises a significant number of people worldwide. Accessibility design can allow websites to be accessed by users who are visually, hearing, motor or cognitively impaired. Difficulties encountered by such users when accessing a web site are many, and include the inability to view or hear content, difficulty in typing or moving a mouse and the inability to differentiate between colors. Accessibility challenges are intensified in Web 2.0 scenarios, as users may not produce accessible content. Various web accessibility standards have been established to aid web developers in producing accessible web pages and content. Such standards include W3C Web Content Accessibility Guidelines versions 1.0 and 2.0 (WCAG 1.0 and WCAG 2.0), U.S. Section 508 of the Rehabilitation Act of 1973 (Section 508) and those set forth in the Disability Discrimination Acts of Australia and the United Kingdom (DDA Australia, DDA UK).

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Tools and techniques are disclosed that estimate web accessibility assessment and remediation efforts. In one embodiment, a user can indicate web accessibility standards against which a web site is to be checked. Standard test effort estimates for the individual indicated standards are calculated based on test factors associated with individual guidelines comprising the standards. The standard test effort estimates are added to generate an estimate of the total amount of test time for testing one web page, a total standard test effort estimate. A total test effort estimate is determined based on the total standard test effort estimate and a number of web pages within the web site. A web accessibility assessment and remediation effort estimate is calculated based on the total test effort estimate.

In another embodiment, a user can select individual guidelines or sub-guidelines within the accessibility standards for inclusion in the standard test effort estimates. In yet another embodiment, a user can select which sub-guidelines to include in standard test effort estimates by selecting priority or success criteria levels associated with the individual sub-guidelines.

In some embodiments, the number of web pages within a web site can be broken down by complexity (e.g., simple, medium, complex). The total test effort estimate can account for varying web page complexities by scaling the total standard test estimate for the accessibility standards accordingly. The number of web pages can be determined manually by a user or automatically by a web crawler software application.

The foregoing and other objects, features and advantages of the invention will become more apparent from the following detailed description, which proceeds with reference to the accompanying figures.

BRIEF DESCRIPTION OF THE DRAWINGS

FIG. 2 is an exemplary spreadsheet for estimating web accessibility assessment and remediation efforts.

FIG. 3 is an exemplary spreadsheet for estimating tool-training efforts.

FIG. 4 is an exemplary spreadsheet for estimating total test efforts.

FIG. 5 is an exemplary spreadsheet for estimating WCAG 1.0 test efforts.

FIG. 6 is an exemplary spreadsheet for estimating WCAG 2.0 test efforts.

FIG. 7 is an exemplary spreadsheet for estimating Section 508 test efforts.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Figure 1:
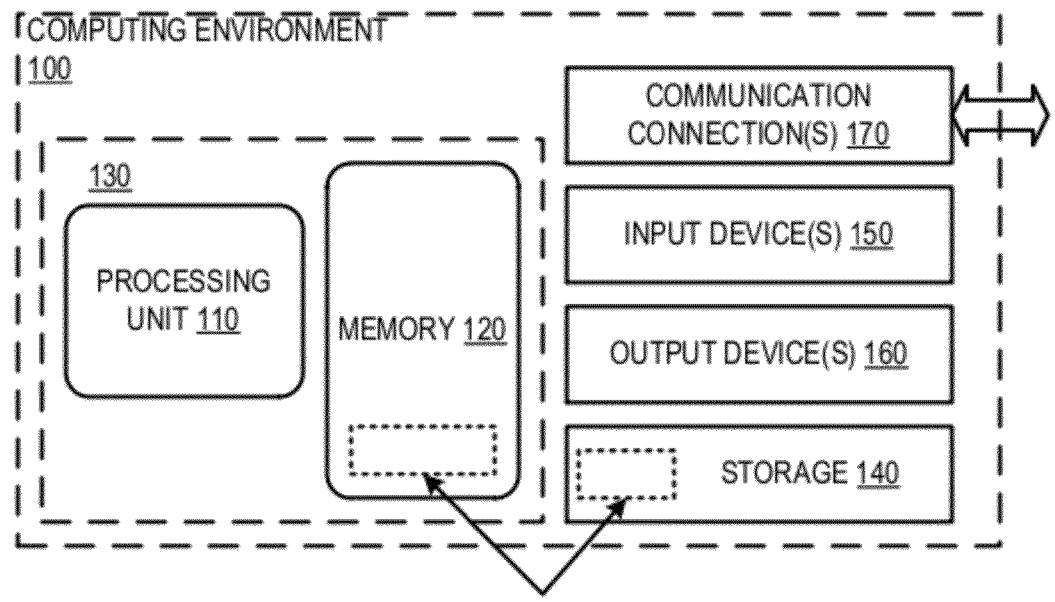
FIG. 1 is a block diagram depicting an exemplary computing environment for estimating web assessment and remediation efforts.

FIG. 1 illustrates a generalized example of a suitable computing environment 100 in which the embodiments, techniques and technologies described herein can be implemented. The computing environment 100 is not intended to suggest any limitation as to scope of use or functionality of the technology, as the technology can be implemented in diverse general-purpose or special-purpose computing environments. For example, the disclosed technology can be implemented using one or more computing devices (e.g., servers, desktop computers, laptop computers, notebook computers, netbook computers, tablet devices, mobile devices, smart phones), each comprising a processing unit, memory and storage storing computer-executable instructions implementing the technologies described herein. The disclosed technologies can also be implemented with other computer system configurations, including multiprocessor systems, microprocessor-based or programmable consumer electronics, network PCs, minicomputers, mainframe computers, a collection of client/server systems and the like. The disclosed technology can also be practiced in distributed computing environments where tasks are performed by remote processing devices that are linked through a communications network, such as the Internet. In a distributed computing environment, program modules can be located in both local and remote memory storage devices.

With reference to FIG. 1, the computing environment 100 includes at least one central processing unit 110 and memory 120. In FIG. 1, this most basic configuration 130 is included within a dashed line. The central processing unit 110 executes computer-executable instructions. In a multi-processing system, multiple processing units execute computer-executable instructions to increase processing power and as such, multiple processors can be running simultaneously. The memory 120 can be volatile memory (e.g., registers, cache, RAM), non-volatile memory (e.g., ROM, EEPROM, flash memory, etc.), or some combination of the two. The memory 120 stores software 180 that can, for example, implement the technologies described herein. A computing environment can have additional features. For example, the computing environment 100 includes storage 140, one or more input devices 150, one or more output devices 160 and one or more communication connections 170. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, CD-RWs, DVDs, or any other tangible storage medium which can be used to store information and which can be accessed within the computing environment 100. The storage 140 stores instructions for the software 180, which can implement technologies described herein.

The input device(s) 150 can be a touch input device, such as a keyboard, keypad, mouse, touchscreen, pen, or trackball, a voice input device, a scanning device, or another device, that provides input to the computing environment 100. For audio, the input device(s) 150 can be a sound card or similar device that accepts audio input in analog or digital form, or a CD-ROM reader that provides audio samples to the computing environment 100. The output device(s) 160 can be a display, printer, speaker, CD-writer or another device that provides output from the computing environment 100.

The communication connection(s) 170 enable communication over a communication medium (e.g., a connecting network) to other computing entities. The communication medium conveys information such as computer-executable instructions, compressed graphics information or other data in a modulated data signal. Software 180 can include a web crawler software application that utilizes the connection(s) 170 to access web pages as part of performing the methods described herein.

FIG. 2 is an exemplary spreadsheet 200 for estimating web accessibility assessment and remediation efforts for one or more web pages. The spreadsheet 200, along with any other spreadsheet described herein can operate within a spreadsheet application executing on any of the computing devices described herein. The spreadsheet 200 can be one of several spreadsheets as part of a web accessibility assessment and remediation effort estimation framework. The web pages for which accessibility efforts and remediation efforts are to be estimated can comprise a series of related web pages, such as web pages within the web site of an organization, disparate web pages, or any individual web page.

The spreadsheet 200 comprises a Phase column 220, a Steps column 230, an Estimation Guideline column 240, an Effort Estimate column 250, a Tools/Templates Reuse column 260 and an Efforts Saved due to Reuse column 270. The spreadsheet 200 can be a main spreadsheet within a set of spreadsheets used for estimating web accessibility assessment and remediation efforts. The Phase column 220 comprises various phases within a software project life cycle. The Steps column 230 comprises one or more steps corresponding to the individual phases. The spreadsheet 200 can comprise more or fewer phases or steps than those shown in columns 220 and 230, respectively. Estimation Guideline column 240 indicates the guideline, or source, of an effort estimate, and Effort Estimate column 250 contains effort estimates for the listed phases and steps. An effort estimate can be a fixed amount or a variable amount calculated from other information, including other effort estimates. Shaded cells within the spreadsheets described herein such as cells 252, 254 and 256 indicate effort estimates that have been calculated or refers to an effort estimates in another spreadsheet. Tools/Templates Reuse column 260 indicates possible sources of tool and template reuse for a particular phase or step. Effort Saved due to Reuse column 270 estimates the effort that can be saved as a result of tool or technology reuse.

The spreadsheet 200 includes software lifecycle phases 280 Gather Test Requirements, Test Strategizing, Prepare Test Cases, Setup Test Environment, Test Execution and Defect Reporting and Defect analysis and Solution Proposition. Other embodiments of the spreadsheet 200 can contain more or fewer phases. The term "test" as used herein refers to a test that assesses the web accessibility for a web page. Accessibility tests include manual tests performed by a person and automatic tests performed by computing devices. Tests can be associated with web accessibility standards as a whole or with individual guidelines or sub-guidelines that comprise a web accessibility standard, such as the checkpoints within WCAG 1.0 or the success criteria of WCAG 2.0.

The Gathering Test Requirements phase contains two steps, Understand test requirements and Prepare the requirement document. The Understand the test requirements step can comprise deciding and understanding which web pages are to be assessed and the web accessibility standards against which the web pages are to be assessed. Understanding which web pages are to be assessed can comprise a customer specifying a domain name and leaving it up to the project team to understand the number and complexity of the web pages within the hierarchy of pages below the provided domain name. In some embodiments, a web crawler software application can be used to determine the number of web pages to be assessed and the complexity of the web pages. The Prepare the requirement document step comprises preparing the spreadsheet 200 and other effort estimation spreadsheets described herein. The spreadsheet 200 contains a fixed time effort estimate of 8.0 person-hours (pHrs) for understanding the test requirements, and 24.0 person-hours for preparing the requirement document. Fixed time effort estimates are effort estimates that are not calculated from other values and can be changed on a project-by-project basis. For example, effort estimates can be increased or decreased based on client sophistication, experience of the personnel performing the assessment tasks (e.g., member of the consultant project team, client personnel), the size of the project and various other factors.

Effort can be saved in preparing the requirement documents by reusing requirement documents (e.g., spreadsheets). That is, a test effort estimate spreadsheet developed for a given accessibility standard can be reused in other projects. For the project shown in spreadsheet 200, 8.0 person-hours are indicated as being saved by re-using testing estimate spreadsheet previously generated. The Test Strategizing phase comprises the Decide on tools Training on specific tools steps. The Decide on tool step has a fixed time estimate of 2.0 person-hours in spreadsheet 200. The effort estimate for the Training on specific tools step references an estimate calculated elsewhere (e.g., a different spreadsheet) as will be described below.

Having various effort estimation calculations, such as the tool training effort estimate, performed in different spreadsheets allows for a flexible and dynamic effort estimate framework. For example, spreadsheet 200 can be a summary spreadsheet that provides an overview of the effort estimates for a given project, with detailed effort estimation calculations such as tool training and testing estimates delegated to other spreadsheets. In this manner, new tools and web accessibility standards can be added to the framework through the modification of existing spreadsheets or adding new spreadsheets while leaving spreadsheet 200 unchanged.

The Prepare Test Cases phase comprises the Create test cases step. In the spreadsheet 200, the estimated effort 254 for the Create test cases step is based on the effort estimate 256. In this example the effort estimate 254 is 20% of the effort estimate 256, although other percentages can be used as appropriate. In other embodiments, the effort estimate 254 can be calculated independent of the Test Execution and Defect Reporting Phase effort estimate 256. The Prepare Test Cases effort can be reduced if previously generate tests are reused. The reuse effort estimate 272 can be a fixed percentage of the effort estimate 254. In spreadsheet 200, the reuse effort 272 is 5% of the effort estimate 254, although other percentages can be used.

The Setup Test Environment phase comprises the step of Set up of test environment. Spreadsheet 200 shows a fixed time of 8.0 person-hours for this step.

The Test Execution and Defect Reporting step comprises the step of Executing test cases and logging the results. The effort estimate for this step is calculated elsewhere and is based on the number and complexity of the web pages being analyzed, and the estimated test efforts for testing a web page against selected web accessibility standards. Calculation of the effort estimate 256 will be discussed in greater detail below. The estimated test execution effort 256 can be reduced by utilizing the iProwe web accessibility assessment tool indicated in cell 265. The reuse effort estimate 274 can be a fixed percentage of the effort estimate 256 or calculated independently of the effort estimate 256. In the spreadsheet 200, the reuse effort estimate 274 is 95% of the effort estimate 256, indicating a high level of reuse if iProwe is used.

The Defect Analysis and Defect Reporting phase can comprise a Root cause analysis and sharing findings with the client step. In the spreadsheet 200, the effort estimate for this step is a fixed time estimate of 8.0 person-hours.

The effort estimates in the Effort Estimate column 250 can be summed to produce a web accessibility assessment and remediation effort estimate 258 for one or more web pages. Although the effort estimate 258 is termed an assessment and remediation effort estimate, the effort estimate 258 of spreadsheet 200 generally does not include an estimation of performing the remediation efforts. That is, the effort estimate 258 typically does not include an estimate of the effort it would take to bring the indicated number of web pages into compliance with the selected web accessibility standards. Alternatives to spreadsheet 200 can contain phases in which remediation efforts are estimated or remediation effort estimates can be included in the any of the software lifecycle phases included in spreadsheet 200.

Spreadsheet 200 can further calculate the cost of performing the estimated web accessibility assessment and remediation efforts by multiplying the effort estimates by the average hourly fee of the personnel to be performing the assessment tasks. In addition, the spreadsheet 200 can comprise effort estimates (and related costs) with and without reuse, and with and without using the iProwe software provided by Infosys® Technologies Limited. The spreadsheet 200 can also account for additional costs in the cost calculations such as the costs for purchasing web accessibility assessment tools. Costs and effort estimates associated with using iProwe comprise iProwe training efforts and a charge for using the iProwe tool. The iProwe tool charge can be based, for example, on the numbers of iProwe scans performed monthly.

Although certain effort estimates are shown in spreadsheet 200 as being fixed time efforts or calculated effort estimates, any effort estimates in the any of the spreadsheets can be a fixed time or calculated effort estimate. Furthermore, the specific values and percentages used in spreadsheet 200 (and other spreadsheets) are for illustration purposes. Actual values and percentages will depend on requirements of a specific implementation or project.

FIG. 3 is an exemplary spreadsheet 300 for estimating web assessment tool training efforts. The spreadsheet 300 comprises a Technology/Tool column 310, a Select Column 320, an Effort Estimate column 330 and a Cost column 340. The Technology/Tool column 310 comprises a list of tools and technologies that can be used in assessing web page accessibility. Such tools and technologies include JAWS (Job Access with Speech, a screen reader software application for visually impaired users and associated scripting language), Color Contrast Analyzer (a software tool for checking background and foreground color combinations to determine whether they provide good color visibility), Opera Browser (a web browser) and the WebbIE Text browser (a web browser for visually impaired users).

Select column 320 provides a selection or indication means for selecting which tools and technologies are to be included in training effort estimates. Selection means 320 can comprise spreadsheet cells programmed to provide a TRUE/FALSE drop-down list such as drop-down list 490 in FIG. 4. Other selection means that can be used include check-boxes, option boxes, toggle buttons and the like. The Effort Estimate column 330 displays the estimated effort on the part of a user to be trained to use the tools or technologies in column 310. The cells in column 330 are programmed with a fixed amount of training effort for the individual tools. The fixed effort estimate is displayed if the tool/technology is indicated to be included in the effort estimate; otherwise, a value of zero is displayed for the effort estimate. For example, JAWS, Opera Browser and WebbIE Text Browser have been selected in spreadsheet 300, causing training effort estimates of 8.0, 1.0 and 1.0 person-hours to appear in column 330 for the respective tools. The effort estimate for Color Contrast Analyzer is displayed as zero person-hours, as that tool was not selected.

Cost column 340 contains cost estimates for the tools. The cells in the Cost column 340 are programmed to display a fixed cost estimate if a tool is selected, zero person-hours if otherwise. Tool costs can include costs associated with purchasing, licensing, installing and maintaining the tool. The tool cost can also include the opportunity cost associated with having a user being trained. The effort and cost estimates can be adjusted on a project-by-project basis. For example, lower estimates can be used in columns 330 and 340 in situations where project personnel only needs to be refreshed on how to use the tool or tools that have already been purchased and installed and only need to be maintained.

As used herein, the phrase "effort estimate calculations" refers to any calculation that is used in estimating web accessibility assessment and remediation efforts for a project (i.e., effort estimate 258 in spreadsheet 200), or any other effort estimate such as tool training estimates 252 and 335, test case preparation estimates 254, and test execution and defect reporting estimates 256 and 460 and average test effort estimates for individual web accessibility guidelines 550, 660 and 760.

The spreadsheet 300 sums the training effort estimates and costs for the individual tools to determine the total tool training effort estimate 350 and costs 360. The total tool training effort estimate 350 can be used as the tool training effort estimate 252 in spreadsheet 200.

FIG. 4 is an exemplary spreadsheet 400 for estimating test efforts for selected web accessibility standards. The spreadsheet 400 contains a list of individual web accessibility standards 410, selection or indication means 420 for indicating which of the standards 410 are to be included in effort estimate calculations, effort estimates 430 for the web accessibility standards (i.e., standard test effort estimates), web page counts 440, estimated test efforts 450 for the indicated number of web pages, total test effort estimate 460 and total standard test effort estimate 480.

The web accessibility standards 410 contain various web accessibility standards such as WCAG 1.0 and 2.0, Section 508, DDA Australia and DDA UK standards, STQC (India) and BITV (Germany) accessibility standards. Selection means 420 comprise check-boxes. The select cells 470 reflect whether the corresponding check-box has been checked. A select cell can be set to TRUE if the check box is checked, FALSE if otherwise. In turn, the corresponding standard test effort estimate 430 can be either set to a calculated test estimate for the corresponding web accessibility standard if the standard has been selected, or to zero if the standard has not been selected. The standard test effort estimates 430 refer to values that are calculated in other spreadsheets, as will be described below. The spreadsheet 400 sums the standard test effort estimates 430 to produce a total standard test effort estimate 480.

The web page counts 440 indicate the number of web pages for which web accessibility assessment and remediation efforts are to be estimated. The web page count can be broken down by web page complexity type (e.g., simple, medium and complex) as shown in spreadsheet 400. In other embodiments of spreadsheet 400, the web page count can be broken down into more or fewer degrees of complexity than those shown. The complexity of a web page can be determined manually or automatically. For example, a web crawler software application can determine the total web page count and determine web page complexity. The web crawler can be provided a list of web pages to be assessed or a top-level or home page of a web site, the web crawler traversing a web page hierarchy to count and assess the complexity of the web pages contained in the hierarchy. In some embodiments, the web crawler can provided a list of web pages that are to be excluded from being assessed.

Web page complexity for web accessibility purposes can be based on various web page attributes or properties such as the number of tags within a web page, the number of audio, images or video elements in a page, the complexity and the amount of text in a web page, the amount of information conveyed by color or sound, the number and complexity of tables in a page, and any other property or attribute relating to accessibility issues addressed by the web accessibility standards.

The effort estimates 450 are calculated based on the web page counts 440 and the total standard test effort estimate 480. The effort estimates 450 are calculated by multiplying the web page counts 440 with the total standard test effort estimate 480 scaled by complexity factors for the various web page complexities. In spreadsheet 400, the complexity factors are 0.1, 0.5 and 1.0 for the simple, medium and complex web page counts, respectively. Thus, in spreadsheet 400, the estimated total effort for a simple complexity web page is 3.86 person-hours, giving 19.3 person-hours for a simple web page count of 5; the estimated total effort for a medium complexity web page is 19.3, giving 57.9 person-hours for a medium web page count of 3; and a complex web page has an estimated total standard test effort of 38.6 person-hours.

Accordingly, the total standard effort estimate 480 for the selected web accessibility standards is used, unscaled, in estimating test efforts for complex web pages, and is scaled down by one-tenth and one-half for simple and medium complexity web pages, respectively. Thus, in this embodiment, the standard test effort estimates 430 are "average" efforts in the sense that they reflect average test effort estimates for complex web pages. The complexity factors can be adjusted on a project-by-project basis and can vary from those used in spreadsheet 400. The complexity factors can also be adjusted such that a complexity factor of 1.0 can be used for calculating the test efforts for simple or medium complexity web pages. In such cases, the standard effort estimates 430 are average in the sense that they reflect the average test effort for simple or medium complexity web pages.

The spreadsheet 400 sums the effort estimates 450 to determine a total test effort estimate 460. The total test effort estimate 460 can be used in estimating effort estimates 254 and 256 for the Test Execution and Defect Reporting and Prepare Test Cases phases in spreadsheet 200.

FIG. 5 is an exemplary spreadsheet 500 for estimating test efforts for the WCAG 1.0 standard. Spreadsheet 500 comprises individual guidelines 510 within WCAG 1.0, priority levels 520 (P1, P2, P3) for the individual guidelines 510, selection or indication means 530 for selecting or indicating the priority levels 520, test factors 540, test effort estimates 550 and a standard test effort estimate 560.

The individual guidelines 510 are comprised of one or more checkpoints, which are not shown in spreadsheet 500. For example, guideline #2, "Don't rely on color alone," in WCAG 1.0 comprises two checkpoints: checkpoint 2.1, "Ensure that all information conveyed with color is also available without color, for example from context or markup," and checkpoint 2.2, "Ensure that foreground and background color combinations provide sufficient contrast when viewed by someone having color deficits or when viewed on a black and white screen." A WCAG 1.0 checkpoint has an associated priority level. A priority level of one indicates that a web content developer must satisfy the checkpoint, a priority level of two indicates that a web content develop should satisfy the checkpoint, and a priority level of three indicates that a web content developer may address the checkpoint. Checkpoint 2.1 has a priority level of one, and checkpoint 2.2 has a priority level of two for images, and three for text. The priority levels 520 represent the checkpoints that are associated with the priority level for a given individual checkpoint. For example, priority level 522 (P1) is associated with checkpoints of individual guideline #2 having a priority level of one (checkpoint 2.1), priority level 524 P2 is associated with checkpoints of individual guideline #2 having a priority level of two (checkpoint 2.2 (images)) and prior level 526 is associated with checkpoints of individual guideline #2 having a priority level of three (checkpoint two (text)).

Selection or indication means 530 comprises means for selecting, by priority level, which checkpoints within an individual guideline 510 are to be included in effort estimation calculations. The means 530 can comprise drop-down lists (e.g., drop-down list 535), check-boxes, option boxes, toggle buttons and the like. If the selection or indication means 530 associated with a priority level indicates that the associated checkpoints are to be included in the effort estimate, the associated effort estimate 550 is included in the effort estimate calculated. For example, the selection or indication means associated with priority levels one and two of individual guideline #2 are set to TRUE, causing the effort estimates of 0.6 and 3.7 person-hours to be displayed. The effort estimates 550 are based on test factors 540. Test factors 540 provide measures of the amount of test effort involved in assessing whether a web page conforms to checkpoints associated with a given priority level for a given individual guideline. For example, test factors 545-547 correspond to checkpoints associated with guideline #4 (Clarify natural language usage) having priority levels one, two and three, respectively. Individual guideline #4 of WCAG 1.0 comprises three checkpoints, one of which has a priority level of one (checkpoint 4.1) and two of which have a priority level of three (checkpoints 4.2 and 4.3). Thus, test factor 545 is a measure of the effort to perform tests for checkpoint 4.1 and test factor 547 is a measure of the effort to perform tests for checkpoints 4.2 and 4.3. As no checkpoints of individual guideline #4 have a priority level of two, the test factor 546 is zero. The test factor 545 value of 11 being greater than the test factor 547 value of three indicates that testing a web page against checkpoint 4.1 takes about 3.7 times the effort to test a web page against checkpoints 4.2 and 4.3.

The test factors can be based on factors such the complexity of a test to check a web page for compliance with an individual checkpoint, the number of checkpoints that have a given priority level for a given individual guideline and the like.

Test factors can be default test factors and can be adjusted on a project-by-project basis. In spreadsheet 500, the effort estimates 550 are a fixed percentage (10%) of the test factor values 540. The fixed percentages can be scaled on a project-by-project basis. The spreadsheet 500 sums the effort estimates 550 to determine a standard test effort estimate 560. The standard test effort estimate 560 represents an estimate of the amount of effort to test a web site against checkpoints of selected individual guidelines having selected priority levels within the WCAG 1.0 standard.

In other embodiments of spreadsheet 500, the spreadsheet can list the checkpoints for the individual guidelines, and the selection or indication means can allow for selection of individual checkpoints on a checkpoint-by-checkpoint basis, rather than on a priority level basis. In other embodiments, the spreadsheet 500 can include global selection means. Global selections means can provide for selection checkpoints within a web accessibility standard having a selected priority level to be included in effort estimate calculations. For example, a user setting a global priority level one selection means can cause the individual guidelines within the WCAG 1.0 standard to be included in effort estimate calculations.

FIG. 6 is an exemplary spreadsheet 600 for estimating test efforts for the WCAG 2.0 standard. Spreadsheet 600 comprises individual guidelines 610 within WCAG 2.0, success criteria levels 620 (A, AA, AAA) for the individual guidelines 610, selection or indication means 630 for selecting success criteria levels for the individual guidelines 610, test factors 640, test effort estimates 650.

The WCAG 2.0 individual guidelines comprise comprising success criteria (not shown). For example, WCAG 2.0 guideline #1.4 comprises nine success criteria—1.4.1 through 1.4.9. Each WCAG 2.0 success criteria has an associated success criteria level A, AA or AAA. WCAG 2.0 success criteria levels indicate which accessibility criteria are to be satisfied in order for a web page to be considered compliant to a given WCAG 2.0 conformance level. In general, level A conformance indicates that a web page satisfies all level A success criteria, level AA conformance indicates that a web page satisfies all level A and AA success criteria, and level AAA conformance indicates that a web page satisfies level A, AA and AAA success criteria.

Selection or indication means 630 are used to indicate which success criteria are to be included in effort estimate calculations. For example, selection or indication means 632 is used to indicate whether all level A success criteria of guideline 1.4 of WCAG 2.0 (which includes success guidelines 1.4.1 (use of color) and 1.4.2 (audio control)) are to be included in effort estimate calculations. The selection means 630 can be any of the selection means described herein. The effort estimates 650 are based on test factors 640. The test factors 640 are similar to the test factors 540 of spreadsheet 500 and indicate relative measures of effort to perform tests on a web page to assess whether the page conforms to A, AA or AAA success criteria for a given individual guideline 610. The test factors 640 can be based on any of the factors listed above in regards to the test factors 540, in addition to others. The effort estimates 650 are based of the test factors 640, and in spreadsheet 600 are a fixed percentage (10%) of the test factor values. Spreadsheet 600 sums the individual test effort estimates 650 to calculate a standard test effort estimate 660 for WCAG 2.0 for the selected individual success criteria. The standard test effort estimate 660 can be used by spreadsheet 400 to calculate the total standard test estimate 480.

The spreadsheet 600 can comprise global selections means, which can be used to indicate which success criteria across all of the individual guidelines in WCAG 2.0 are to be included in effort estimate calculations. For example, a global selection means can be used to indicate that all level A success criteria for all WCAG 2.0 individual guidelines are to be included in effort estimate calculations.

As used herein, the term "sub-guidelines" refers to any subdivision of individual guidelines within any web accessibility standard. For example, sub-guidelines can refer to the checkpoints within WCAG 1.0 individual guidelines or success criteria of WCAG 2.0 individual guidelines.

FIG. 7 is an exemplary spreadsheet 700 for estimating test effort for the Section 508 web accessibility standard. The spreadsheet 700 shows a condensed version of a test effort estimation spreadsheet. The Section 508 web accessibility standard comprises a number of individual guidelines, §1194.22(a)-(p). Instead of containing the individual guidelines, spreadsheet 700 contains a single-line entry for the Section 508 standard. The spreadsheet 700 contains a single global selection means 720 for indicating whether to all or none of the Section 508 guidelines are to be included in effort estimate calculations. The spreadsheet 700 comprises a test factor 740 and an effort estimate 750, which possess similar characteristics to the test factors and effort estimates described above in regards to spreadsheets 500 and 600. That is, the test factor 740 provides a measure of the amount of effort to perform a test to assess a web page against the Section 508 guidelines, and effort estimate 750 is an effort estimate in person-hours based on the test factors 740. In the example, the selections means 720 has been set to TRUE, indicating that all Section 508 guidelines are to be included in effort calculations. In other embodiments, spreadsheet 700 can contain one or more of the Section 508 individual guidelines. In some embodiments, spreadsheets 500 and 600 can be in a condensed form similar to that of spreadsheet 700, in which all or a plurality of the individual WCAG 1.0 or 2.0 guidelines are indicated for inclusion in effort estimate calculations via global selection means. For example, spreadsheet 600 can be configured such that a global selection means can be used to indicate whether A, AA or AAA success criteria for 1.x, 2.x, 3.x or 4.x individual guidelines are to be included in effort estimates.

Additional spreadsheets can be included in an effort estimation framework to estimate efforts for other accessibility standards such as DDA Australia, DDA UK, and the India STQC (Standardization, Testing and Quality Certification) and German BITV (Barrierefreie Informationstechnik-Verordnung) accessibility standards. The spreadsheets can comprise selection or indication means for selecting or indicating which individual guidelines or sub-guidelines (e.g., success criteria, checkpoints) are to be included in effort estimate calculations. The spreadsheets can determine a standard effort estimate for a web accessibility standard, which can be included in effort estimates 430 in spreadsheet 400.

The disclosed spreadsheets can be provided as part of a web accessibility effort estimate framework. The framework is flexible in that any number of spreadsheets capable of calculating effort estimates for additional web accessibility standards can be added. The framework can be implemented as a Microsoft® Excel workbook containing the disclosed effort estimate spreadsheets. Although the spreadsheets have been discussed with certain calculations being performed on separate spreadsheets, any of the disclosed calculations can be performed on any number of spreadsheets, or just one spreadsheet.

Figure 8:
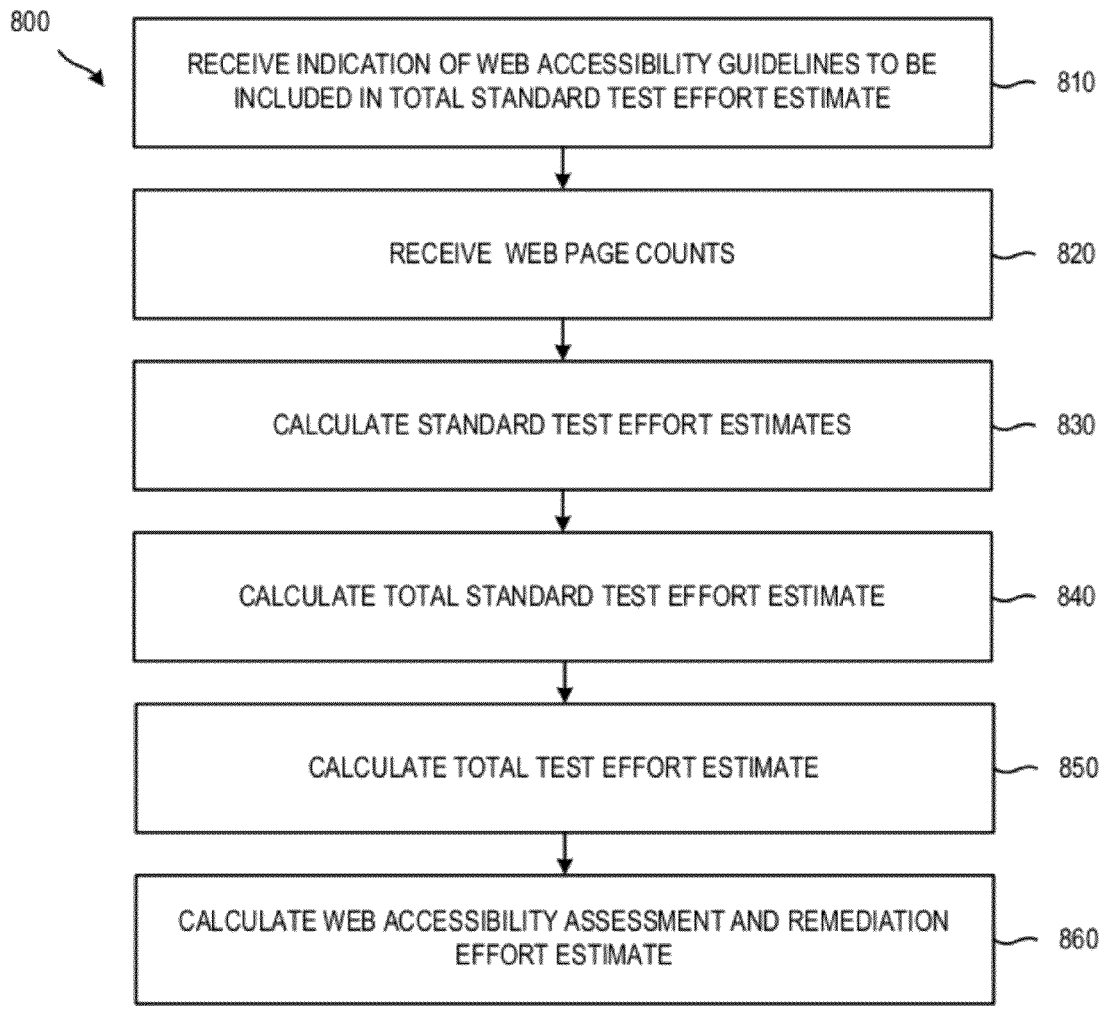
FIG. 8 is an exemplary block diagram of a method of estimating web accessibility assessment and remediation efforts.

FIG. 8 is a block diagram of an exemplary method 800 of estimating web accessibility assessment and remediation efforts for one or more web pages. The method 800 can be performed by a computing device running a spreadsheet application loaded with spreadsheets comprising a framework for estimating web accessibility assessment and remediation efforts, the framework being used to estimate accessibility and remediation efforts for a web site. At 810, an indication of one or more indicated web accessibility standards to be included a total standard test effort estimate is received. In the example, the spreadsheet application can receive an indication that WCAG 1.0 and WCAG 2.0 are to be included in a total standard test effort estimate. At 820, one or more web page counts corresponding to the one or more web pages are received. In the example, the spreadsheet application receives a number of web pages within the website.

At 830, standard test effort estimates for respective of the one or more indicated web accessibility standards are calculated. The standard test effort estimates are based at least in part on test factors associated with the indicated one or more web accessibility standards. In the example, the spreadsheet application calculates standard test effort estimates for the WCAG 1.0 and WCAG 2.0 standards. The calculations are based on test factors associated with the WCAG 1.0 and WCAG 2.0 standards. At 840, a total standard test effort estimate is calculated from the standard test effort estimates. In the example, a total standard estimate is calculated from the WCAG 1.0 and WCAG 2.0 standard test effort estimates.

At 850, the total test effort estimate is calculated based at least in part on the total standard test effort estimate and the one or more web page counts. In the example, the spreadsheet application calculates a total effort estimate based on the total standard test effort estimates and the received number of pages. At 860, a web accessibility assessment and remediation effort estimate is calculated for the one or more web pages based on the total effort estimate. In the example, a web accessibility assessment and remediation effort estimate for the web site is calculated by the spreadsheet application based on the total standard test effort estimates for the WCAG 1.0 and WCAG 2.0 standards In some embodiments, the method 800 can further comprise receiving the test factors. In some embodiments, the method 800 can further compris receiving an indication of one or more individual guidelines of the web accessibility standards to be included in the standard test effort estimates, the standard test effort estimates being based at least in part on test factors associated with the indicated individual guidelines.

In some embodiments of the method 800, the receiving an indication of the one or more of individual guidelines to be included in effort estimate calculations can comprise receiving an indication of which sub-guidelines of the individual guidelines are to be included in standard test effort estimates, the standard test effort estimates being based at least in part on the test factors associated with the at least one of the one or more sub-guidelines. The receiving an indication of the one or more of the plurality of individual guidelines to be included in the standard test effort estimates can comprise receiving an indication of at least one of a plurality of priority or success criteria levels for at least one of the individual guidelines, the standard test effort estimates being based at least in part on the test factors associated with the at least one of the one or more of the plurality of priority or success criteria levels for the at least one of the individual guidelines. In the example, the spreadsheet application can receive an indication that WCAG 1.0 checkpoints associated with a priority level of one and individual guidelines #2 and #3 and WCAG 2.0 level A success criteria associated with individual guidelines #1.3 and #3.1 are to be included in effort estimate calculations.

In some embodiments, the method 800 can further comprise a web crawler software application capable of determining the one or more web page counts and complexities of the one of more web pages. The web crawler can determine a web page complexity based at least in part on the number of tags in a web page. In some embodiments of the method 800, the calculating the web accessibility assessment and remediation effort estimates can be further based on a gather test requirements effort estimate, a test strategizing effort estimate, a prepare test cases effort estimate, a setup test environment effort estimate, and a defect analysis and solution proposition effort estimate.

In any of the examples described, any computer-executable instructions for implementing the disclosed techniques as well as any data created and used during implementation of the disclosed embodiments can be stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile computing devices that include computing hardware). Computer-readable storage media does not include signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure. Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Having illustrated and described the principles of the illustrated embodiments, the embodiments can be modified in various arrangements while still remaining faithful to the concepts described above. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A computer-implemented method of estimating web accessibility assessment and remediation efforts for one or more web pages, the method comprising:

receiving an indication of one or more indicated web accessibility standards to be included in a total standard test effort estimate;

receiving one or more web page counts corresponding to the one or more web pages;

calculating standard test effort estimates for respective of the one or more indicated web accessibility standards, the standard test effort estimates being based at least in part on test factors associated with the indicated one or more web accessibility standards;

calculating the total standard test effort estimate based on the standard test effort estimates;

calculating a total test effort estimate based at least in part on the total standard test effort estimate and the one or more web page counts;

calculating a web accessibility assessment and remediation effort estimate for the one or more web pages based at least in part on the total test effort estimate;

wherein respective of the indicated one or more web accessibility standards comprise a plurality of individual guidelines, the plurality of individual guidelines comprising one or more sub-guidelines, the test factors being further associated with the plurality of individual guidelines and the one or more sub-guidelines;

receiving an indication of one or more of the plurality of individual guidelines to be included in the standard test effort estimates, the receiving then indication of one or more of the plurality of individual guidelines comprising receiving an indication of at least one of the one or more sub-guidelines to be included in the standard test effort estimates, the standard test effort estimates being based at least in part on the test factors associated with the at least one of the one or more sub-guidelines; and wherein respective of the plurality of individual guidelines are associated with one or more of a plurality of priority or success criteria levels, the receiving the indication of one or more of the plurality of individual guidelines to be included in the standard test effort estimates comprising receiving an indication of at least one of the one or more of the plurality of priority or success criteria levels for at least one of the individual guidelines, the test factors being associated with the at least one of the one or more of the plurality of priority or success criteria levels for the at least one of the individual guidelines, the standard test effort estimates being based at least in part on the test factors associated with the at least one of the one or more of the plurality of priority or success criteria levels for the at least one of the individual guidelines.

2. The method of claim 1, further comprising receiving the test factors.

3. The method of claim 1, wherein the standard test effort estimates being based at least in part on the test factors associated with the indicated one or more of the plurality of individual standards.

4. The method of claim 1, the one or more web page counts comprising a simple web page count, a medium web page count and a complex web page count.

5. The method of claim 1, the method further comprising determining, using a web crawler application, the one or more web page counts.

6. The method of claim 5, the method further comprising determining, using the web crawler application, a complexity for respective of the one or more web pages.

7. The method of claim 6, the one or more web page counts comprising a simple web page count, a medium web page count and a complex web page count, the web crawler application determining the simple web page count, the medium web page count and the complex web page count based on the complexity determined for respective of the one or more web pages.

8. The method of claim 6, the complexity for respective of the one or more web pages being based at least in part on a number of tags in respective of the one or more web pages.

9. The method of claim 1, the calculating the web accessibility assessment and remediation effort estimate being further based on a gather test requirements effort estimate, a test strategizing effort estimate, a prepare test cases effort estimate, a setup test environment effort estimate, and a defect analysis and solution proposition effort estimate.

10. The method of claim 1, the method being implemented as one or more spreadsheets for use with a spreadsheet software application running on a computing device, the method further comprising displaying, by the computing device to a user, the web accessibility assessment and remediation effort estimate.

11. One or more computer-readable storage media storing computer-executable instructions for causing a computing device to perform a method, the method comprising:
   receiving an indication of one or more indicated web accessibility standards to be included a total standard test effort estimate;
   receiving one or more web page counts corresponding to the one or more web pages;
   calculating standard test effort estimates for respective of the one or more indicated web accessibility standards, the standard test effort estimates being based at least in part on test factors associated with the indicated one or more web accessibility standards;
   calculating the total test effort estimate based at least in part on the standard test effort estimates and the one or more web page counts;
   calculating a total test effort estimate based at least in part on the total standard test effort estimate and the one or more web page counts;
   calculating a reuse effort estimate based on the total effort estimate;
   calculating a web accessibility assessment and remediation effort estimate for the one or more web pages based at least in part on the total test effort estimate:,
   wherein respective of the indicated one or more web accessibility standards comprise a plurality of individual guidelines; and
   receiving an indication of one or more of the plurality of individual guidelines to be included in the standard test effort estimates, wherein respective of the plurality of individual guidelines are associated with one or more of a plurality of priority or success criteria levels;
   wherein the plurality of individual guidelines comprising one or more sub-guidelines, the test factors being further associated with the one or more sub-guidelines, the receiving the indication of one or more of the plurality of individual guidelines comprising receiving an indication of at least one of the one or more sub-guidelines to be included in standard test effort estimates and receiving an indication of at least one of the one or more of the plurality of priority or success criteria levels for at least one of the individual guidelines, the test factors further being associated with the indicted at least one of the one or more of the plurality of priority or success criteria levels for at least one of the individual guidelines; and
   wherein the standard test effort estimates being based at least in part on the test factors associated with the indicated at least one of the one or more sub-guidelines and associated with the indicated at least one of the one or more of the plurality of priority or success criteria levels for the at least one of the individual guidelines.

12. The one or more computer-readable storage media of claim 11, wherein the test factors being associated with the plurality of individual guidelines, and the standard test effort estimates being based at least in part on the test factors associated with the one or more of the plurality of individual standards.

13. A computer-implemented framework for calculating web accessibility assessment and remediation efforts for one or more web pages, the framework comprising:
   one or more first spreadsheets associated with one or more web accessibility standards, the one or more first spreadsheets comprising:
      a plurality of individual guidelines for respective of the one or more web accessibility standards, wherein respective of the plurality of individual guidelines are associated with one or more of a plurality of priority or success criteria levels;
      one or more test factors associated with respective of the plurality of individual guidelines, the plurality of individual guidelines comprising one or more sub-guidelines associated with the one or more test factors;
      a first indication means for a user to indicate one or more of the plurality of individual guidelines for inclusion in one or more standard test effort estimates, to indicate at least one of the one or more sub-guidelines for inclusion in the one or more standard test effort estimates, and to indicate at least one of the one or more of the plurality of priority or success criteria levels associated with at least one of the one or more plurality of individual guidelines, the one or more first spreadsheets being configured to calculate the one or more standard test effort estimates based at least in part on the one or more test factors associated with the at least one of the one or more of the plurality of individual guidelines associated with the indicated at least one of the one or more of the plurality of priority or success criteria levels and associated with the indicated at least one of the one or more sub-guidelines;
   a second spreadsheet comprising a second indication means for a user to indicate at least one of the one or more web accessibility standards for inclusion in a total test effort estimate, the second spreadsheet being configured to:
      receive one or more web page counts; and
      calculate the total test effort estimate based on the one or more web page counts and the one or more standard test effort estimates calculated by the one or more first spreadsheets; and
   a third spreadsheet being configured to calculate a web accessibility assessment and remediation effort estimate based on the total test effort estimate.

14. The framework of claim 13, the framework comprising the third spreadsheet further comprising:
   one or more of a gathering test requirements effort estimate, a test strategizing effort estimate; a preparing test cases effort estimate, a test environment setup effort estimate, and a defect analysis and solution proposition effort estimate,
   the third spreadsheet being configured to:
      calculate a test execution and defect reporting effort estimate based on the total test effort estimate calculated by the second spreadsheet; and
      calculate the web accessibility assessment and remediation effort estimate based on the test execution and defect reporting effort estimate and the one or more of the gathering test requirements effort estimate, the test strategizing effort estimate; the preparing test cases effort estimate, the test environment setup effort estimate, and the defect analysis and solution proposition effort estimate.

15. The framework of claim 13, the second spreadsheet being further configured to receive the one or more web page counts from a web crawler application.

16. The framework of claim 15, wherein the one or more web page counts comprises a simple web page count, a medium web page count and a complex web page count, the second spreadsheet configured to receive the simple web page count, the medium web page count and the complex web page count from the web crawler.

17. The framework of claim 14, further comprising a fourth spreadsheet comprising:
   one or more tool training effort estimates associated with one or more tools or technologies; and
   a means for a user to indicate at least one of the one or more tools or technologies for inclusion in the test strategizing effort estimate, the fourth spreadsheet being configured to calculate the test strategizing effort estimate based on the one or more tool training effort estimates associated with the indicated at least one of the one or more tools or technologies.

* * * * *

UNITED STATES PATENT AND TRADEMARK OFFICE
CERTIFICATE OF CORRECTION

PATENT NO. : 8,572,549 B2  
APPLICATION NO. : 13/109859  
DATED : October 29, 2013  
INVENTOR(S) : Ganesh et al.

Page 1 of 1

It is certified that error appears in the above-identified patent and that said Letters Patent is hereby corrected as shown below:

In the Specification:

Column 5, line 25, "previously generate" should read --previously generated--;

Column 6, line 14, "in the any of the" should read --in any of the--;

Column 9, line 27, "3.7times" should read --3.7 times--;

Column 10, line 24, "based of the" should read --based on the--;

Column 10, line 51, "whether to all" should read --whether all--;

Column 11, line 40, "included a total" should read --included in a total--;

Column 12, line 6, "compris" should read --comprise--;

In the Claims:

Column 14, line 26, "receiving then indication" should read --receiving the indication--;

Column 15, line 23, "included a total" should read --included in a total--;

Column 15, line 61, "indicted" should read --indicated--.

Signed and Sealed this
Seventeenth Day of May, 2016

Michelle K. Lee
*Director of the United States Patent and Trademark Office*